United States Patent [19]

Winzer et al.

[11] 4,339,290

[45] Jul. 13, 1982

[54] PROCESS FOR MANUFACTURING A BRANCH ELEMENT

[75] Inventors: Gerhard Winzer; Achim Reichelt; Herbert Michel, all of Munich, Fed. Rep. of Germany

[73] Assignee: Siemens Aktiengesellschaft, Berlin & Munich, Fed. Rep. of Germany

[21] Appl. No.: 148,169

[22] Filed: May 8, 1980

[30] Foreign Application Priority Data

May 23, 1979 [DE] Fed. Rep. of Germany ....... 2920957

[51] Int. Cl.³ .......................................... B65H 69/02
[52] U.S. Cl. .................................. 156/159; 156/304.1; 350/96.16
[58] Field of Search ................ 350/96.15, 96.16, 96.20, 350/96.21, 96.22, 169, 173, 320; 156/158, 159, 304.1

[56] References Cited

U.S. PATENT DOCUMENTS

| 3,870,396 | 3/1975 | Racki et al. | 350/96.16 |
| 3,874,779 | 4/1975 | Thiel | 350/96.16 |
| 4,130,345 | 12/1978 | Doellner | 350/96.22 |
| 4,176,908 | 12/1979 | Wagner | 350/96.15 |

OTHER PUBLICATIONS

Bloem et al., "Fiber-Optic Coupler", *IBM Tech. Discl. Bulletin*, vol. 16, No. 1, Jun. 1973, pp. 146-147.

*Primary Examiner*—John D. Lee
*Attorney, Agent, or Firm*—Hill, Van Santen, Steadman, Chiara & Simpson

[57] ABSTRACT

A branching element for distributing light from a group of incoming waveguides to outgoing waveguide groups characterized by a member having at least three separate groups of channels, all the channels in each group being parallel to each other and lying in a plane of the group, two of said groups of channels being aligned to lie in the same plane with the channels of the one group being axially aligned with the channels of the other group and separated therefrom by a common partially permeable reflecting layer extending at an angle to the plane and formed by the two groups of channels, at least one additional group of channels extending at an angle to the plane of the two aligned groups of channels and intersecting the aligned two groups of channels at a common reflective layer, and light waveguides being arranged in each of the channels, the light waveguides in the channels of the two aligned groups having end faces extending in the plane of the layer and enaged therewith and the waveguides in the additional groups having end faces engaging the waveguides in one of the two aligned groups of channels.

8 Claims, 17 Drawing Figures

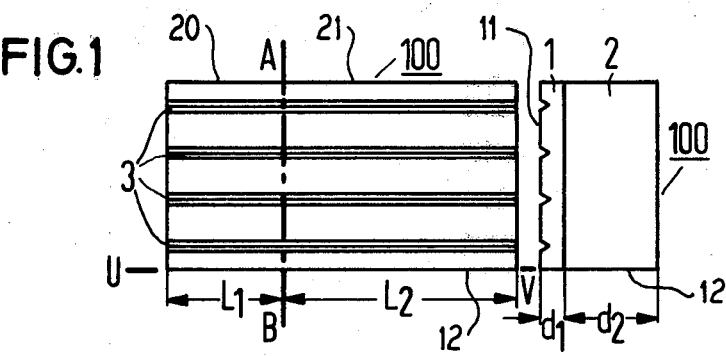
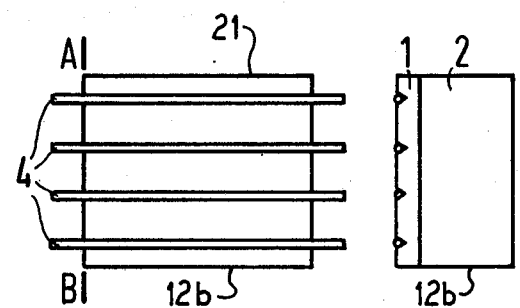
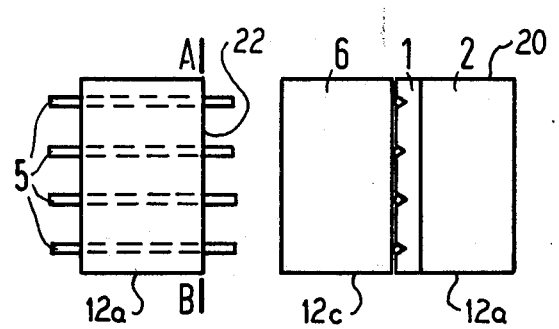
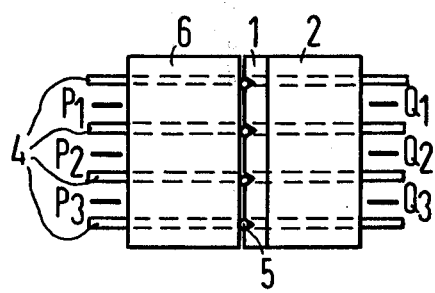

PROCESS FOR MANUFACTURING A BRANCH ELEMENT

BACKGROUND OF THE INVENTION

The present invention is directed to a branching element which has at least three groups of waveguides which are arranged with two groups of waveguides extending in the same plane and at least one additional group of waveguides extending at an angle to the plane of the two aligned groups with the waveguides of the two aligned groups being separated by a common partially reflective layer that extends in a plane bisecting the angle between the additional waveguides and the two groups of aligned waveguides.

A branching element, which has a pair of axially aligned waveguides separated by a partially reflective layer extending in a plane of 45° to the waveguide and has at least one additional waveguide extending perpendicular to the aligned waveguides and having an axis intersecting the axis of the pair of aligned waveguides in the plane of the reflective layer, is disclosed in copending U.S. Patent application Ser. No. 93,519, filed Nov. 13, 1979, which was based on German patent application No. P 28 51 679.2.

SUMMARY OF THE INVENTION

The present invention is directed to providing a branching element similar to the known type which has a plurality of aligned groups of waveguides and which can be produced either as a branching element with multiple waveguides or can be economically produced and then subdivided into a plurality of single branch elements.

To accomplish these tasks, the branching element of the present invention comprises a member having at least three separate groups of channels, all of the channels in each group being parallel to each other and lying in a plane of the group, two of said groups of channels being aligned to lie in the same plane with the channels of the one group being axially aligned with the channels of the other group and separated therefrom by a common partially permeable reflective layer extending at an angle to the plane formed by the two groups of channels, at least one additional group of channels extending at an angle to the plane of the two aligned groups of channels and intersecting the two aligned groups of channels at the common reflective layer, and light waveguides being arranged in each of the channels, the waveguides in the channels of the two aligned groups having end faces extending in the plane of the layer and engaging therewith and the waveguides in each of the additional groups of channels having end faces engaging the waveguides in one of the two aligned groups of channels.

In accordance with the branch connection of the present invention, it comprises a plurality of pairs of the aligned waveguides which are arranged parallel to one another in one plane and all of the pairs are separated by a common reflective layer. In respect to each pair of channels, at least one additional waveguide channel extends from the reflective layer and from one of the aligned guide channels of the pair. Thus the branch element comprises a block comprising a plurality of identical, simple branching elements, which are arranged parallel to one another in various planes. If desired, a plurality of the single branching elements can be produced from this single branch element by simply dividing up the single branch element along a plurality of planes which extend parallel to the planes of the aligned waveguides.

The branch element having a plurality of aligned branches can be produced by providing a body having a flat surface, forming a plurality of parallel guide channels in the flat surface, dividing the body along a plane extending at right angles to the guide channels to form a first part and a second part, inserting a waveguide into each of the channels of each of said parts, securing the waveguides in the first part with an optical adhesive and a cover member, polishing the joining surface of the first part to be optically flat, positioning the first part on a surface of the second part with the axes of the waveguides of each part being in the same planes and extending at right angles to each other, securing the two parts together in the selected position to form an assembly, splitting the assembly along a plane bisecting the angle formed by the planes of the waveguides of the two parts to form a pair of halves with a split surface extending at 45° to the plane of each of the groups of waveguides, polishing each of the split surfaces of the half to be optically flat, applying a partially reflective layer on one of the two polished surfaces and assembling the two halves with the axis of the corresponding waveguides being in axial alignment.

Another possibility for forming the device includes providing a starting body having a flat surface, forming a plurality of parallel extending guide channels in said flat surface, subdividing the starting body in a plane extending at right angles to the axis of the guide channels into a first and second part, positioning light waveguides into each of the channels of each of the two parts, securing the light waveguides in both parts by utilizing cement and a cover member, polishing the end surfaces of each of said first and second parts to be optically flat, said end surfaces extending at an angle to the axis of the waveguides, applying a light sensitive thick film onto the polished surface of the first part, producing a plurality of parallel extending guide channels photolithographically in the light sensitive thick film, each of said channels intersecting the axis of an existing light waveguide in said first part at right angles thereto, securing a light waveguide in each of the guide channels formed in the thick film, positioning the second part with the polished surface on thick film with the light waveguides of the second part in either alignment or the desired position with the light waveguides of the first part, securing the first and second parts by cementing in the position to form an assembly, splitting the assembly in the two halves by splitting along a plane bisecting the two planes of waveguides, polishing each of the split surfaces formed by the steps of splitting to be optically flat, providing a common partially permeable reflector layer on one of the said polished split surfaces, repositioning the two halves with the polished surfaces of the other halves engaging the partially permeable reflective layer with the waveguides being in alignment with groups of waveguides of the first half and securing the halves in said aligned reassembled position.

Both of the above methods can enable forming a multiple branch element having a plurality of individual branch elements which can be subsequently separated therefrom. Thus, the method enables utilizing a single alignment step to align each of the waveguides of each of the individual branch elements of a multiple device with a corresponding reduction in the cost for alignment which is inversely proportional to the number of individual branching elements being formed. A further simplification of the process can be advantageously achieved providing the steps of aligning to be self adjusting. This is accomplished by providing the starting member with a flat alignment or guide surface which extends perpendicular to the flat surface of the starting member and then forming the grooves or channels in the flat surface to extend parallel to this alignment or guide surface. In this manner, in addition to the simplification of the process, high accuracy and reproduceability are also achieved.

This guide or alignment surface which is formed on a side surface to extend perpendicular to the flat surface, can serve as a reference surface for later adjustment of the light waveguides relative to one another. Thus, when the branching element multiple is assembled on a flat assembly board or a control surface, the various parts of the multiple member merely need to be positioned with the alignment surface resting against the common stop means.

An advantageous further development is provided with the dimensions of the component required for the branching element multiples being selected to be such, so that the necessary divisions take place in such a manner that the finished branch element multiple is of a parallelepiped shape. In this way, several branching element multiples of the present invention can be combined as required in accordance with the unit assembly principal to form multiple branching elements.

BRIEF DESCRIPTION OF THE DRAWINGS

FIGS. 1-11 show various steps in the process of forming a branch element in accordance with the present invention with FIG. 1 being a plan view of the beginning or starting member;

FIG. 2 is an end view of the member of FIG. 1;

FIG. 3 shows a part after a step of subdividing and inserting waveguides;

FIG. 4 shows an end view of the part of FIG. 3;

FIG. 5 shows the other part after subdivision with the waveguides and a cover;

FIG. 6 shows an end view of the part of FIG. 5;

FIG. 7 shows the assembly of the part of FIG. 6 on the part of FIG. 3;

FIG. 8 is a perspective view of the assembly of FIG. 7;

FIG. 9 shows the assembly at the point of splitting;

FIG. 10 shows the assembly after the step of splitting, polishing the split surfaces, and applying a reflective layer;

FIG. 11 shows the parts assembled in the final arrangement;

FIG. 13 shows waveguides inserted in the guide channels; and

FIG. 14 shows the parts assembled in the final arrangement;

DESCRIPTION OF THE PREFERRED EMBODIMENTS

Figure 11:
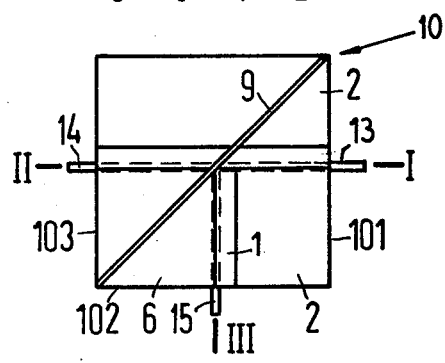

The principles of the present invention are particularly useful in forming a branch element generally indicated at 10 in FIG. 11 which branch element has at least three separate groups 13, 14 and 15 of waveguides with the waveguides 13 and 14 lying in the same plane and being axially aligned and the waveguides in the group 15 lying in the plane extending perpendicular to the plane of the aligned waveguide groups of 13 and 14. The device has the aligned waveguide groups 13 and 14 separated by a partially reflective layer 9 which also intersects the axes of the waveguides in the group 15.

In the preferred process for forming the branching element 10, a starting body 100 (FIG. 1) is provided and as illustrated comprises a silicon plate 1 and a substrate 2. The silicon plate 1 is cemented on the substrate 2, which is preferably a glass substrate and the plate 1 has a flat surface 11 which has a plurality of channels 3 formed therein. It should be noted, that the starting body 100 can be a single substrate such as a glass substrate. The guide channels 3 can be produced or formed, for example, by scratching, stamping, embossing, or laminating. The distance between the individual guide channels 3 is considerable in comparison with the width and the depth of these channels, for example, 2 mm and the guide channels 3 have a width of approximately 215 μm and when silicon is used the sides of each of the channels form an angle of 70.53°. In each case, the profile of each of the guide channels 3 must be adapted to the outer diameter of the light waveguides which are to be inserted therein. The starting body 10 on a side surface which lies on the plane U-V is polished to produce a guide or alignment surface 12, which extends perpendicular to the flat surface 11 and is parallel to the channels 3. In particular, the substrate 100 is formed with the guide or orientation surface 12 preferably prior to forming the channels 3, which are then formed to extend parallel to the plane of the surface 12.

When silicon is used, the requirement of providing the channels 3 parallel to the surface 12 is easily fulfilled. For example, the guide channels can be formed by first forming an etching mask photolithographically with a high degree of precision in a photo lacquer which was applied on the flat surface 11. Then the grooves 3 are subsequently anisotropically etched into the silicon plate 1.

After forming the grooves 3 in the starting body 100, it is subdivided along a plane A—B, which extends perpendicular to the axes of the channels 3, to form two parts or sections 20 and 21. The part 20 will have a length $L_1$, and the part 21 will have a length $L_2$. Preferably, the length $L_1$ of the section or part 20 is selected to be approximately equal to $d_1$ plus $d_2$ wherein $d_1$ is the thickness of the silicon plate 1 and $d_2$ is the thickness of the substrate 2, and the value $L_1$ is smaller than or equal to 0.5 $L_2$.

Figure 8:
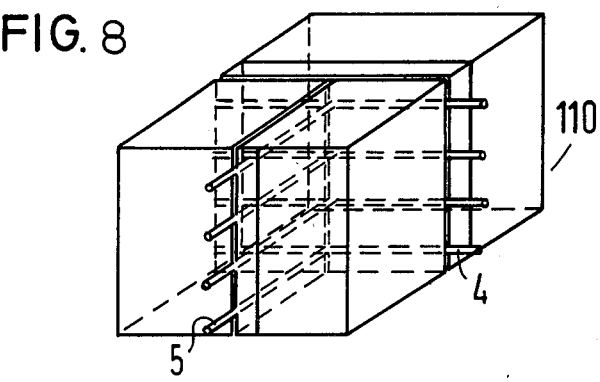

As best illustrated in FIGS. 3 and 4, the light waveguides 4 are slackly inserted into the guide channels of the part or component 21 having the length $L_2$. Light waveguides 5 are likewise inserted into the guide channels 3 of the section or part 20 which has the length $L_1$. However, these waveguides are secured or cemented by optical adhesive to the silicon plate 1 and covered with a cover 6, which preferably consists of glass. During the cementing process care is taken so that the flat surface of the cover 6 precisely coincides with the surface 11 of the part 20 and the guide surface or edge 12c of cover 6 is in the plane of guide surface 12a of part 20. The structure which is formed in this way consists of the substrate 2, the silicon plate 1, the light waveguides 5 and the cover 6 as best illustrated in FIG. 6. After securing the waveguides 5 and the cover 6 on the body 20, and end surface such as end surface 22 is then polished optically flat so that the waveguide surfaces are of an optical quality and arranged in one plane with the end surface of the part. The part as produced and illustrated in FIG. 6 is now positioned on the part 21 of FIG. 4 with the guide surfaces 12a and 12b lying in the same plane so that the waveguides 5 will be axially aligned with the respective waveguides of the group 4 of the part 21. This is preferably carried out by utilizing a flat assembly device so that the surfaces 12a and 12b lay on a control surface of the assembly device and position each of the fibers 5 with its axes extending perpendicular and aligned with the axis of each of the fibers 4. The alignment is ideally obtained due to the fact that the guide channels 3 in each of the two parts were originally one channel formed in the starting member 100. Due to the specific selection of the values $d_1$, $d_2$, $L_1$ and $L_2$, a parallelepiped 110 (FIG. 8) is formed which comprises a plurality of identical light waveguide T-structures. For simplicity, only four such structures are illustrated in each of the FIGS. 1–8. However, in reality the parallelepiped can have a large number of structures, for example thirty individual T-structures.

Figure 10:
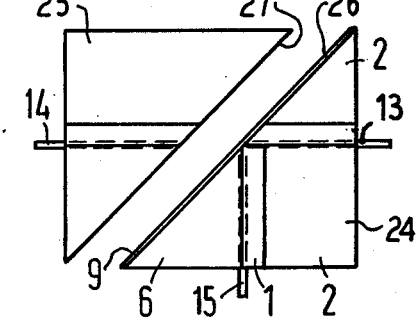

After forming the parallelepiped 110, it is now split or divided in a known manner along a plane of the line C-D, which plane extends at an angle of 45° to the axes of both light waveguides 4 and 5 and the planes formed by these axes. As illustrated, the splitting forms halves 24 and 25 as illustrated in FIG. 10. The half 24 will have a split surface 26 and also contains the waveguides 5 which form a group 15 and a waveguide group 13 which is part of the original waveguides 4. The half 25 will have a split surface 27 and a waveguide group 14 which was formed from the original waveguides 4 by the splitting process. Each of the split surfaces 26 and 27 are polished so that they are optically flat and a divider reflector or partially reflecting layer 9 is applied to one of the split surfaces such as the polished surface 26. The reflecting layer can be applied by vapor depositing the layer on the surface and it can consist of either a metallic partially transparent reflector or a dielectric reflector. After providing the reflecting layer 9, the two parts 24 and 25 are reassembled with the waveguides of the group 13 axially aligned with waveguides of group 14 and in the reassembled position the halves are secured together by cementing using an optical cement to form the branching element 10 having multiple waveguides of FIG. 11.

Figure 15:
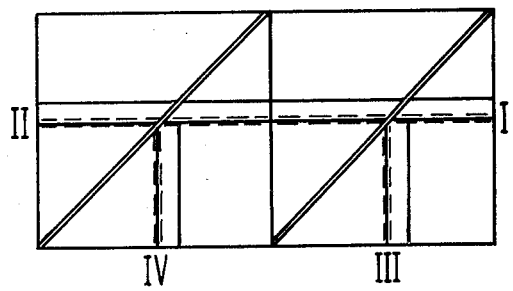
FIG. 15 shows a pair of branching elements in accordance with the present invention assembled in a particular arrangement.
Figure 16:
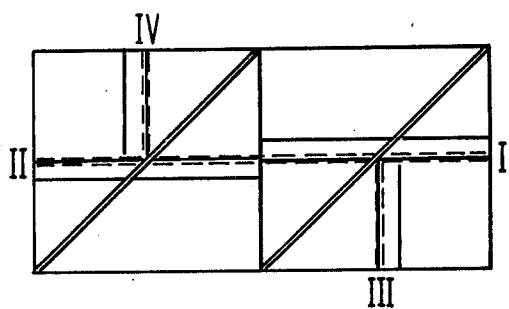
FIG. 16 shows another arrangement of a pair of branching elements in accordance with the present invention.
Figure 17:
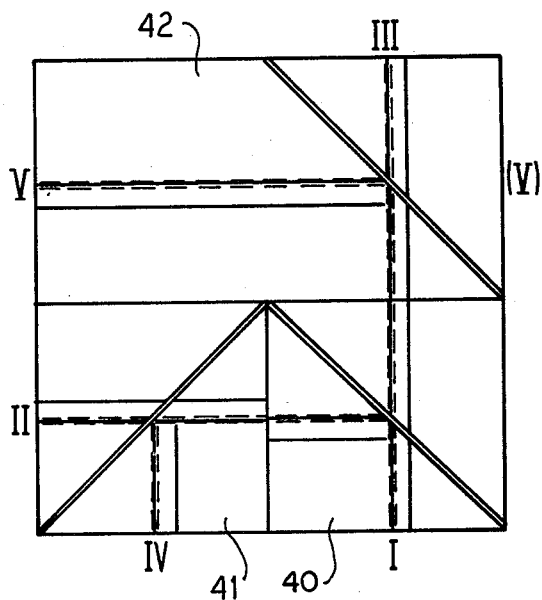
FIG. 17 shows a third arrangement of three branching elements of the present invention.

Subsequent to the step of cementing to join the parts together to form the branching element 10, the surfaces 101, 102, and 103 from which the various waveguides project may be polished to an optical flat condition so that the unit 10 is suitable as a part of an assembly of plurality of similar units (see FIGS. 15–17). Each individual multiple can also be coupled to a section of an optical cable by a multiple light waveguide plug.

While the unit 10 has a plurality of light waveguide T-structures arranged therein, it may be subdivided into a plurality of branch elements which only have the three waveguides arranged in a single T-structure. Thus, if the unit has n number of waveguide T-structures, it can be subdivided into an n number of elements. By cutting multiple element 10 on three planes P1-Q1, P2-Q2, and P3-Q3 (shown in FIG. 7), the multiple branch elements can be separated into four individual T-structure units. As pointed out hereinabove, these T-structure units are more economically made due to the fact that the one alignment step for the parts 21 and 22 produce the parallelepiped 110, and one alignment step of the halves 24 and 25 produce the unit 10. It also should be noted that each of these units when viewed from the side will have the configuration of the unit 10 in FIG. 11.

Figure 9:
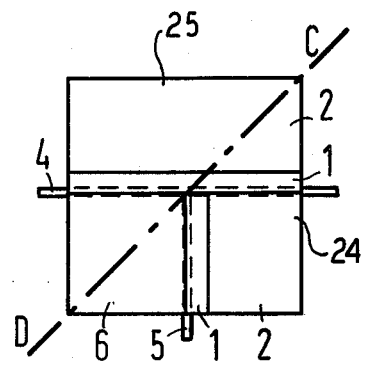
Figure 12:
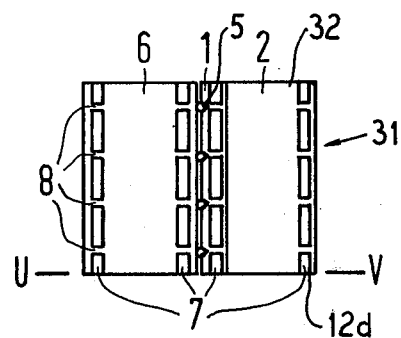
FIGS. 12, 13 and 14 show another process according to the invention with FIG. 12 showing a part similar to that of FIG. 6 having guide channels formed on a polished surface.
Figure 13:
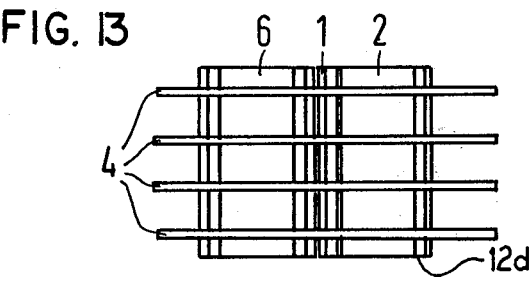
Figure 14:
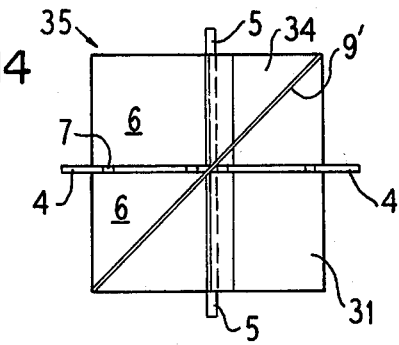

In FIGS. 12, 13 and 14, a variation of a process steps for producing a branch element which has four separate groups of waveguides is illustrated. In this variation, after producing a starting body 100 having grooves or channels 3, which extend parallel to an orientation surface or guiding surface 12, the body is subdivided into two equal parts with the fibers or optical fibers 5 placed in each of the grooves and a covering plate 6 attached to produce a part 31 such as illustrated in FIG. 12. After polishing an end surface such as 32, and after polishing each of the units on the flat surface 12d to lie on the plane U-V, one of the two bodies or parts 31 is provided with a light sensitive thick film 7, which is laminated on the joint polished surface 32. As illustrated, the film is provided in a series of strips that extend perpendicular to the plane U-V and the surface 12d. These strips can be formed either photolithographically or by controlling the application of the thick film layer 7. The next step of the process is to form guide channels 8, which extend parallel to the surface 12d and are aligned with each of the fibers 5. These guide channels 8 can be formed photolithographically in the thick film 7. After forming the channels 8, waveguides 4 are inserted into the channels 8 and are thus aligned with the waveguides 5 but extend perpendicular thereto. After assembling the waveguides 4 in the member as illustrated in FIG. 13, the second waveguide part 34, which is the same as the unit 20 illustrated in FIG. 6, is assembled on the part 31 with the polished surface engaging the remaining portions of the thick layer 7 and the waveguides 5 being axially aligned with the waveguides 5 on the part 31 (FIG. 14). After this assembly, the two parts 31 and 34 are cemented together by an optical adhesive to form a parallelepiped which is similar in many respects with a parallelepiped 110 except that four groups of waveguides are present. After completion of the step of securing the units together, the further processing steps, such as splitting the unit into two halves, polishing the split surfaces, applying the reflector 9', and then reassembling the parts together to form the element 35, are the same as the steps of the first process which were described with regard to FIGS. 9–11. In contrast to the first described process however, each of the individual structures of the multiple branching element 35 no longer has a T-structure but has a cross structure with four gates or connections.

In FIGS. 15, 16 and 17, branch elements whether they are branch elements having only a single waveguide T-structure or a plurality of waveguides arranged in groups can be arranged in various combinations. Since each of these elements has a block structure, it can be arranged in various building block combinations. In addition, the combination having the cross structure can also be produced by the method discussed with regard to FIGS. 12, 13 and 14 and can also be arranged in various combinations.

The basic form for each of the branch elements having a T-structure is that of the element 10 of FIG. 11. In FIG. 11, the unit 10 was illustrated as having three gates or couplings I, II, and III.

In FIGS. 15 and 16, two elements 10 are combined on a flat mounting plate having stop means (not illustrated) in different arrangements. The arrangement of FIG. 15 is suitable for example for unidirectional input coupling and output coupling of a signal into a main line designated I-II. Advantageously, the transmitter is arranged at the input III while the receiver is at the output IV. This allows for a reduction, for example, in the interference in the signal received by the subscriber as a result of its own transmitter.

In the arrangement illustrated in FIG. 16, a bidirectional terminal is produced. All of the blocks of the units of the arrangement are in terms of the geometric dimension. It is possible that the beam dividers can differ in design with respect to divider ratios and/or spectral characteristics.

In FIG. 17, a five-gate tree structure is illustrated. The gates have been characterized by I to V. If suitable dimensioning beam dividers 9 are used, the five gates or couplings in FIG. 17 can be used for example as a multiplexer for combining four light wave lengths or as a demultiplexer for separating the latter. In the case of a demultiplexer, in order to increase the cross-talk attenuation, it is advantageous to arrange narrow band filters at each of the output couplings II to IV which band filters only transmit the desired wave length in their coupling. In the arrangement illustrated in FIG. 17, the three units 40, 41, and 42 are used and the units 40 and 41 do not have the same length as the unit 42 so as to form a compact device in which the light waveguide end surfaces form a parallelepiped. However, if the block or unit 42 were rotated by a 180° so that the output V would be in the position on the right-hand side of the arrangement, then the unit 42 could have the same size as the unit 40 and 41 with all of the three units being geometrically identical blocks. However, this may require a higher production tolerance during the production of the assembly from the units.

As indicated by the exemplary embodiments and with the aid of a simple process steps, it is possible to produce a multiple branching element comprising a large number of identical waveguide structures, which can be combined in accordance with the unit assembly principal to form arbitrary T-structures or tree structures. Furthermore, these multiple branching elements can be simply subdivided to form individual branching elements whereby the outlay for these individual branching elements is substantially reduced.

Although various minor modifications may be suggested by those versed in the art, it should be understood that we wish to embody within the scope of the patent granted hereon all such modifications as reasonably and properly come within the scope of our contribution to the art.

We claim:

1. A process for producing a branch element having at least three separate groups of channels containing waveguides with the channels of each group being parallel to each other and two groups of channels being arranged to extend in the common plane separated by a common reflective layer with the channels of each of the two groups being axially aligned and at least one additional group extending from one of the two aligned groups at the common reflective layer, said process comprising the steps of providing a body having a flat surface, forming a plurality of parallel guide channels in the flat surface, dividing the body along a plane extending at right angles to the guide channels to form a first part and a second part, inserting a waveguide into each of the channels of each of said parts, securing the waveguides in the first part with an optical adhesive and a cover member, polishing an end surface of the first part to be optically flat and form a joining surface, positioning the first part with the joining surface on the flat surface of the second part with the axes of the waveguides of each part being in the same planes and extending at right angles to each other, securing the two parts together in the selected position to form an assembly, splitting the assembly along a plane bisecting the angle formed by the planes of the waveguides of the two parts to form a pair of halves with split surfaces extending at forty-five degrees to the plane of each group of waveguides, polishing each of the split surfaces of the halves to be optically flat, applying a partially reflective layer on one of the two polished surfaces, assembling the two halves with the axes of the corresponding light waveguides being in axial alignment, and securing the assembled halves together to form the element.

2. A process according to claim 1, wherein the step of positioning the parts and the step of assembling the two halves are self adjusting.

3. A process according to claim 2, wherein the step of providing the body having a flat surface includes polishing a side surface to be a flat guide surface extending perpendicular to the flat surface of the body, said step of forming a plurality of parallel guide channels forms the guide channels to extend parallel to the guide surface.

4. A process according to claim 3, wherein each of the steps of positioning the first part and second part and the step of assembling the halves utilizes the guide surface on a flat controlled surface to enable axial alignment of the respective waveguides.

5. A process according to claim 1, wherein the step of dividing the body along a plane to form the first and second parts, positions said plane in the body so that the thickness of the first part plus the cover equals the length of the second part so that the step of assembling the two halves creates a branching element having a parallelepiped shape.

6. A process for producing a branching element having four groups of waveguides with the waveguides of two groups being in the same plane and being axially aligned and the waveguides of the other two groups lying in a plane and extending at right angles to the plane of the first two groups, said process comprising the steps of providing a starting body having a flat surface, forming a plurality of parallel extending guide channels in said flat surface, subdividing the starting body in a plane extending at right angles to the axis of the guide channels into a first part and a second part, positioning light waveguides in each of the channels of each of the two parts, securing the light waveguides in both parts by utilizing cement and a cover member, polishing an end surface of each of said first and second parts to be optically flat, said end surface extending at an angle to the axis of the waveguides, applying a light sensitive thick film onto the polished end surface of the first part, producing a plurality of parallel extending guide channels photolithographically in the light sensitive thick film with each of said channels in the film intersecting the axis of an existing light waveguide in said first part at right angles thereto, securing a light waveguide in each of the guide channels formed in the thick film, positioning the second part with the polished end surface on the thick film with the light waveguides of the second part in a desired position with respect to the light waveguides of the first part, securing the first and second parts together in said position by cementing to form an assembly, splitting the assembly into two halves by splitting along a plane bisecting the two planes of waveguides, polishing each of the split surfaces formed by the step of splitting to be optically flat, providing a common partially permeable reflector layer on one of said polished split surfaces, repositioning the two halves with the polished surface of the other half engaging the partially permeable reflector layer with the waveguides of the other half being in alignment with groups of waveguides of the one half to place the halves in an aligned reassembled position, and securing the halves in said aligned reassembled position together to form said element.

7. A process according to claim 6, wherein the step of providing the starting body includes polishing the side surface of the starting body to be a flat alignment surface extending perpendicular to the flat surface of said body, said step of forming a plurality of parallel extending guide channels in the flat surface forming said guide channels to extend parallel to said flat alignment surface, and wherein both said steps of positioning the second part with the polished surface on the thick film and the step of repositioning the two halves include providing a member having a flat control surface and positioning the first and second parts and the halves with the flat alignment surfaces engaged on the control surface so that the waveguides of the parts and the halves are axially aligned.

8. A process according to claim 7, wherein the step of subdividing divides the first and second parts into parts of equal lengths so that the securing of the halves in the aligned reassembled position produces a branching element having a parallelepiped shape.

* * * * *